Aug. 19, 1969  R. L. LEWIS ET AL  3,462,200
FLUID PRESSURE PROPORTIONING MEANS
Filed Dec. 16, 1966
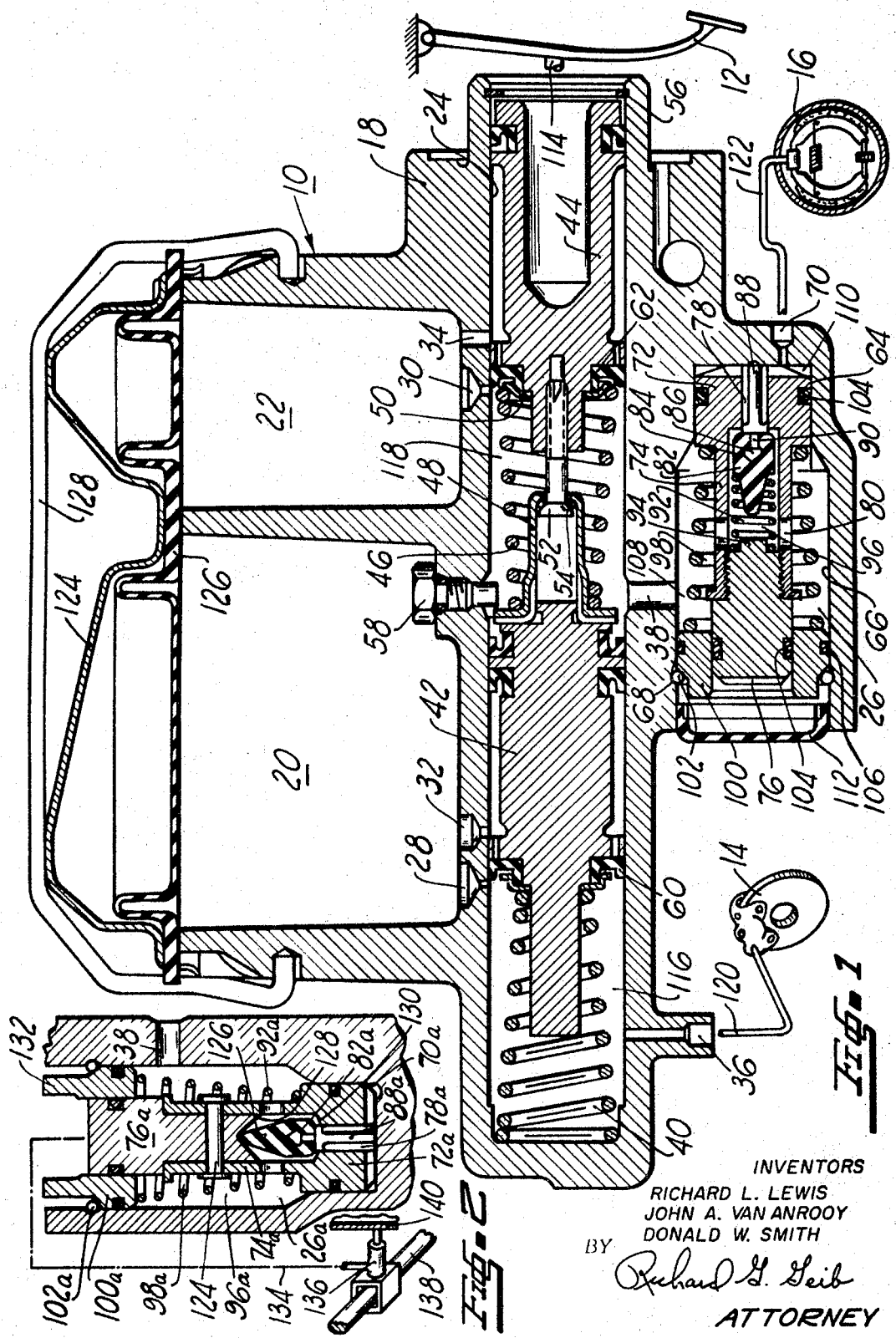
INVENTORS
RICHARD L. LEWIS
JOHN A. VAN ANROOY
DONALD W. SMITH
BY Richard G. Geib
ATTORNEY

United States Patent Office 3,462,200
Patented Aug. 19, 1969

3,462,200
FLUID PRESSURE PROPORTIONING MEANS
Richard L. Lewis, John A. Van Anrooy, and Donald W. Smith, St. Joseph, Mich., assignors to The Bendix Corporation, a corporation of Delaware
Filed Dec. 16, 1966, Ser. No. 602,397
Int. Cl. B60t 13/00, 8/18; F15b 7/00
U.S. Cl. 303—6                                 7 Claims

ABSTRACT OF THE DISCLOSURE

This invention relates to a simplified proportioning means employing a differential area piston within a housing that includes a resilient poppet valve and a concentric spring arrangement. The invention is also related to the integration of such a proportioning valve in a fluid actuator.

Related patents

This invention is related to and is an improvement over U.S. Patents Nos. 2,207,173, 3,088,285, 3,175,896, 3,210,941, 3,245,729 and 3,258,924. In a very remote sense this application is also related to a patent application of the common assignee bearing Ser. No. 452,241 now U.S. Patent No. 3,312,062 filed Apr. 30, 1965.

Summary

A principal object of this invention is to provide a proportioning valve for a fluid pressure system which will have greater design flexibility than is attendant to prior art structures in order to enable practical and economical variations to accomplish the desired proportioning of fluid pressure.

It is also a principal object of this invention to provide a proportioning valve that is integrated with a fluid pressure actuator so as to eliminate the need for separate valves and thus reduce the complexity of a fluid pressure system.

It is a more detailed object of this invention to provide a proportioning valve design which lends itself to both internal and external spring control.

A still further and more detailed object of this invention is to provide a proportioning valve with a resilient poppet so that the valve will be more dirt tolerant than is attendant with known prior art devices.

A final and further object of this invention is to provide a proportioning valve which reduces the number of seals whose failure could mean a fluid loss to a fluid pressure system in which it is being utilized.

Drawing description

FIGURE 1 shows, in schematic form, a vehicle brake system with a proportioning valve in accordance with the principles of my invention employed in a split system type master cylinder shown in cross section; and FIGURE 2 shows a cross sectional view of a modified form of proportioning valve and a schematic system to render such valve load proportioning.

Detailed description

With more particular regard to the drawing, there is shown a master cylinder 10 employed in a vehicle braking system to be actuated by a brake pedal 12 for supplying fluid pressure to a front disc brake 14 and a rear drum brake 16. It should be realized that while the invention is shown with regard to a vehicle braking system, that it has many applications and is in fact applicable to any hydraulic actuating system.

The master cylinder 10 is of a split system type, i.e., it is capable of developing at least two separate hydraulic pressures. It is preferably constructed by first casting a housing 18 to form reservoir chambers 20 and 22 as well as longitudinal bores 24 and 26. The housing could be machined from stock, if desired. Assuming for the purposes of explaining this invention that the housing is cast, it is thereafter machined to provide compensating ports 28 and 30 and hydraulic fluid filling ports 32 and 34 between the respective reservoir chambers 20 and 22 and the longitudinal bore 24. Also a pair of spaced ports 36 and 38 are machined to lead from the longitudinal bore 24. After the machining of these ports the longitudinal bore 24 is provided with a desired finish and a piston assembly is inserted therein to have a return spring 40 between the closed end of the bore and a floating piston 42 which is in turn connected to an operator-operated piston 44 by a caged spring assembly comprising spring 46 and retainers 48 and 50 held to the piston 44 by a bolt 52 with an anti-noise ring 54 between the bolt head and the retainer 48. The retainer 48 is abuttingly connected to the floating piston 42, and the entire piston assembly is held within the bore 24 by a snap ring 56 in a groove adjacent the open end of the bore 24. After the piston assembly has been inserted into the bore 24, a stop in the form of a machine bolt 58 is inserted through an appropriately threaded opening in the housing 18 from the reservoir 20 to the bore 24 to limit the released position of the pistons 42 and 44 so that respective lips of their seals 60 and 62 cannot enter the filling ports 32 and 34. It should be recognized by those skilled in the art to which this invention relates that the spring 46 will be slightly stronger than the spring 40 so that upon the actuation of the piston assembly by the brake pedal 12 the compensating ports 28 and 30 are simultaneously closed by the passage thereover of the lips of the seals 60 and 62.

The bore 26 is finished similar to that of the bore 24. However, in the structure shown it is provided with a stepped down portion 64 and an enlarged portion 66 immediately therebehind opening outwardly to the left, as viewed in the drawing. A groove 68 is machined adjacent the open end of the bore 26, and a discharge port 70 is provided at the closed end of the bore through the housing 18. After the machining of the bore 26, a differential piston assembly is inserted therein having a large diameter end 72 with a tubular body 74 and a small diameter end 76 affixed to the tubular body 74. While the manner of connecting the small end 76 to the tubular body 74 and consequently the large end 72 of the differential piston assembly is shown as being one of a threaded type connection, it should be realized that these two ends could be assembled by press fitting, pinning, etc. The large end 72 is provided with an axial passage 78 and the tubular portion 74 has radial passages 80 so that the port 38 may be communicated via the passageway 78 to the discharge port 70.

Prior to the assembly of the small end 76 to the large end 72 by screwing it into the tubular body 74 a resilient poppet valve comprising a rubber poppet 82 having a molded triangular chamber 84 formed in one end and opened outwardly threof is snap fitted to a head 86 connected to a valve stem 88 by a neck 90. The valve stem 88 is grooved to be supported by the passage means 78 in the large end 72 while also permitting fluid communication through the passageway. A valve spring 92 is affixed to the other end of the resilient poppet 82, which preferably is of rubber composition, and is assembled over a projection 94 of the small end 76 to be compressed between the poppet 82 and the small end 76 and thereby urge the valve stem 88 outwardly of the passage means 78 upon assembly of the small end 76 to the tubular body 74 forming a valve chamber 96 in the tubular body. A spring 98 is then assembled over the differential area piston to be concentric therewith and an annular bushing 100 is inserted over the small end 76 and moved inwardly of the bore 26 until a snap ring 102 can be assembled to the groove 68 in the bore 26, whereby the spring 98 will be compressed between the annular bushing 100 and the large end 72 of the differential area piston. It should be noted that the large end and the small end are provided with dynamic seals 104 and that the bushing is provided with a static seal 106 to maintain the integrity of the two variable volume portions 108 and 110 of the chamber within the bore 26. Finally, a cup 112 is inserted into the open end of the bore 26, and a rubber boot (not shown) is inserted over the housing 18 adjacent the open end of the bore 24 to grip on the push rod 114 and thereby prevent dirt from contaminating either the bore 26 or 24, respectively.

Next, the fluid reservoirs 20 and 22 are filled with hydraulic fluid which is conducted via the filling ports 32 and 34 not only to variable volume chambers 116 and 118, but also to the portions 108 and 110 of the chamber in the bore 26 and run via lines 120 and 122 to provide hydraulic fluid for the braking system. Thereafter a cap 124 having a sealing diaphragm 126 abridging same is assembled to the housing 18 by means of a spring clip 128.

It should be readily recognized that the area of the small ends 76 of the differential piston assembly may be readily varied by increasing or decreasing its size and simply providing a different annular bushing 100 to close the end of the bore 26.

With reference now to FIGURE 2 there is shown a modification of the proportioning valve having a small diameter end 76a connected to a tubular body 74a of a large diameter end 72a by a pin 124 to form the differential piston assembly. However, in this version the valve chamber 96a is shortened by extending the projection of the small diameter end 76a inwardly of the tube 74a so that the apex 126 of the resilient valve 82a will abut on the surface 128 of the projection of the small diameter end 76a. The assembly of the small diameter end 76a to the large diameter end 72a is such that the resilient valve 82a is under slight compression to force the grooved stem 88a, to which the valve is attached as aforementioned with respect to FIGURE 1, to project from the passage 78a in the large diameter end 72a. As with the proportioning valve in FIGURE 1, the differential piston assembly is then inserted into the bore 26a of the master cylinder housing 18 and a spring 98a is concentrically arranged therewith so that a bushing 100a that is inserted over the small diameter end 76a and held in the bore by a snap ring 102a will cause the spring 98a to force the large diameter end 72a toward the closed end of the bore 26a whereby the stem 88a will abut upon the housing to further compress the resilient valve 82a and lift it from a valve seat 130 about the passage means 78a adjacent the valve chamber 96a.

It should also be noted that in this modification of the proportioning valve, there is provided a means to render the valve load proportioning by simply providing threads in the bushing 100a as at 132 for the receipt of a fitting (not shown) that will connect a line 134 from a hydraulic load cell 136 operatively arranged between an axle 138 and a frame member 140 for the associated vehicle. This will provide a hydraulic link between the load cell and the proportioning valve so that whenever the distance between the frame member 140 and the axle 138 varies, the loading on the differential piston assembly will also vary to determine the proper point at which the proportioning valve is desired to cut-in to proportion rear brake pressure in accordance with front brake pressure.

In closing, it should be noted that the integration of the proportioning valve with the fluid actuator will be advantageous from the standpoint of servicing the fluid system if for no other reason than the elimination of complex bleeding of air attendant to systems employing separate valves of this type.

Operation

In operation, the brake pedal 12 is moved to the left, as viewed in the drawings, to move the pistons 44 and 42 simultaneously, because of the proportioning of the springs 40 and 46, to close the compensating ports 28 and 30 and begin pressurization of variable volume chambers 116 and 118. The pressure thus created in chambers 116 and 118 are respectively discharged from ports 36 and 38 to in the former pass immediately to the disc brakes 14. From the port 38 the pressure enters chamber portion 108, and via the radial passage 80, the valve chamber 96 and the passage means 78, because of the impingement of the valve stem 88 on the housing 18 whereby the poppet 82 is away from the opening of the passage means 78, passes through conduit 122 to the drum brake 16. As pressure begins to build in both the chambers 116 and 118, the braking action takes on a different picture. For example, the pressure within the portion 108 of the bore 26 will act on the effective annular area between the small end 76 and the large end 72 to, in addition to the pressure on the effective area of the large end 72 in the portion 110 of the same chamber, cause the differential area piston to move to the left whereby the valve poppet 82 is urged by spring 92 and the pressure thereacross to abut over the opening of the passage means 78 and thereby terminate direct flow from the chamber 118 to the drum brake 16. Thereafter, the pressure being developed for the drum brake 16 will be the function of the annular area and the area of the large end 72 and be directly attributable to the increase in pressure in the variable volume portion 110 in the bore 26 which will be proportionately less than the increase in pressure in the portion 108.

Upon release, the brake pedal 12 will move back to the right and the spring 40 will cause the pistons 42 and 44 to follow this movement of the brake pedal. The volume is thus increased in the chambers 116 and 118 to return the pressure from the disc brake 14 and allow the differential area piston to first move to the left to absorb fluid returning from brake 16 in chamber portion 110. When the pressure in 110 essentially equals that in 108, the piston starts to move to the right whereby the poppet 82 is opened by differential pressure and fluid in brake 16 returns to the chamber 118 via the passage means in the differential area piston. The pressure thus also returns the pistons 42 and 44 until the compensating ports 28 and 30 are again uncovered by the lips of the seals 60 and 62 whereby the hydraulic fluid in the system may be replenished from or returned to the reservoirs 20 and 22, respectively.

While the operation of the valve of FIGURE 2 is considered obvious in view of the foregoing description with respect to the operation of FIGURE 1, it should be noted that, as aforementioned, whenever the distance between the frame member 140 and the axle 138 decreases, the amount of master cylinder pressure to displace the differential piston assembly so as to permit the closing of the resilient valve 82a by its own inherent spring forces will be increased. Likewise, whenever the distance between the frame member 140 and the axle 138 increases, the pressure required to operate the differential piston assembly and the valve within the valve chamber 96a will decrease.

We claim:
1. A fluid pressure proportioning device comprising:
a housing having a first bore with inlet and outlet ports;
a first movable means operatively arranged in said first bore between said inlet and outlet ports, said first means having a first area adjacent one of said ports and a passage therethrough;
a second movable means operatively connected to said first means to create a valve chamber therebetween in fluid communication with said passage and another of said ports, said second means being operatively connected to said housing by an annular bushing to have a second area adjacent said another of said ports which is less than said first area;

a resilient valve means having an integral resilient projection for biasing said valve means toward a valve seat about an opening of said passage into said valve chamber, said resilient valve means being in said valve chamber and further having a valve stem on the side opposite its integral resilient projection that is attached therewith, said valve stem being operatively connected to said second means and being urged by said integral resilient projection outwardly of said passage beyond said first area of said first movable means; and means to position said first means in said first bore and cause said stem to lift said resilient valve means off said valve seat.

2. A fluid pressure proportioning device according to claim 1 wherein said housing is further characterized as including a second bore communicating with said inlet;

an operator-operated piston means in said second bore for developing a fluid pressure for said second bore; and wherein said annular bushing includes means to link said second means to a load sensing means to render said device load responsive.

3. A proportioning valve for a hydraulic pressure, said valve comprising:

a housing having an inlet to said pressure and an outlet for supplying said pressure with an open-ended bore in said housing connecting said inlet with said outlet;

a differential area piston having a large end slidably engaging the wall of said bore and a small diameter end removably connected thereto, which differential area piston includes a passageway beginning between said ends and passing through one of said ends to communicate said inlet to said outlet via said passageway;

a valve means in said passageway, said valve means including, a valve stem that is adapted to permit fluid flow through and supported by said passageway, said stem having a head portion connected thereto by a neck portion, a resilient poppet having an internal chamber adjacent one end opening outwardly at that end by a small hole receiving the head of said valve stem to affix the poppet and the stem, and a valve spring means operatively connecting the other end of said poppet to said piston in said passageway to project said stem therefrom to thereby control the valve position in said passageway by contacting said stem with said housing to control fluid flow therethrough in accordance with the position of said differential area piston in said bore;

an annular bushing whose outer periphery is removably affixed to the housing in said bore and whose inner opening operatively supports said small diameter end of said differential area piston to form an annular variable volume chamber between said large diameter end and the annular bushing supporting said small diameter end; and means to, in absence of a predetermined pressure, keep said valve means open by biasing said differential area piston such that said valve stem contacts said housing and removes said poppet from its seating contact with said passageway.

4. A proportioning valve according to claim 3 wherein said valve means is further characterized in that said valve spring for said poppet is a resilient projection of said poppet compressed between the other end of said poppet with respect to the end affixed to said stem to said piston to normally bias said stem to extend exteriorly of said piston to be operatively connected to said housing.

5. A proportioning valve in accordance with claim 4 and further comprising load sensing means operative in conjunction with said means biasing said differential area piston.

6. A proportioning valve comprising:

a housing having an internal, open-ended chamber with an inlet and outlet port means, said housing also including a bore in which tandem pistons are operatively arranged to deliver separate pressures one of which is fed to said inlet port means of said open-ended chamber;

piston means in said chamber for controlling communication of said inlet with said outlet to regulate the fluid pressure to be delivered from said outlet as a function of that being supplied to said inlet, said piston means including a first end of predetermined area in said chamber dividing same into two variable volume portions, one of which is adjacent the closed end and the outlet port, said first end having a tubular body about a passage means therethrough, said tubular body having radial passages communicating with said other variable volume portion of said chamber, a second end of lesser area than said first end for said piston means, which second end is removably secured to said first end to close said tubular body and form a valve chamber therein, dynamic seal means for both said first and at said second end, and a resilient valve poppet means snap fitted to a valve stem supported by and adapted to permit fluid flow through said passage means through said stem being biased by said poppet means to extend beyond said first end to be operatively connected to said housing in which position said poppet seats on said first end to close said passage means therethrough, said resilient valve poppet means being within said passage means;

an annular bushing receiving said second end, said bushing having a static seal and being removably located in the open end of said chamber to close said second variable volume portion; and a spring concentric with said piston means between said bushing and said first end to normally position said first end to impinge said stem on said housing and displace said resilient valve poppet away from said passage means in which attitude fluid flows from said inlet port to said outlet port via said passage means.

7. A proportioning valve in accordance with claim 6 and further comprising load sensing means operative in conjunction with said spring to position said piston.

References Cited

UNITED STATES PATENTS

| | | | |
|---|---|---|---|
| 2,074,416 | 3/1937 | Oliver | 60—54.5 |
| 3,162,491 | 12/1964 | Van Wisen | 303—6 |
| 3,167,360 | 1/1965 | Oberthur | 303—6 X |
| 3,168,351 | 2/1965 | Stelzer | 303—6 |
| 3,233,947 | 2/1966 | Oberthur | 303—6 X |
| 3,308,620 | 3/1967 | Melinat | 303—6 X |
| 3,315,469 | 4/1967 | Stelzer | 303—6 X |
| 3,321,914 | 5/1967 | MacDuff | 60—54.5 |
| 2,106,671 | 1/1938 | Watson. | |

FOREIGN PATENTS 911,096 11/1962 Great Britain.

MILTON BUCHLER, Primary Examiner

JOHN J. McLAUGHLIN, Jr., Assistant Examiner

U.S. Cl. X.R.

60—54.5; 137—508; 188—152; 303—22